United States Patent [19]

Taniguchi

[11] Patent Number: 4,699,102
[45] Date of Patent: Oct. 13, 1987

[54] STRUCTURE FOR MOUNTING SUB-COMBUSTION CHAMBER IN AN INTERNAL COMBUSTION ENGINE

[75] Inventor: Masato Taniguchi, Aichi, Japan

[73] Assignee: NGK Spark Plug Co., Ltd., Aichi, Japan

[21] Appl. No.: 889,735

[22] Filed: Jul. 28, 1986

[51] Int. Cl.[4] ............................................. F02B 3/00
[52] U.S. Cl. .................................... 123/271; 123/270
[58] Field of Search ............... 123/270, 271, 272, 273, 123/254

[56] References Cited

U.S. PATENT DOCUMENTS 3,257,994  6/1966  Clements ............................ 123/271
3,259,116  7/1966  Bricout .............................. 123/270
4,616,611  10/1986  Ogawa ............................... 123/271

FOREIGN PATENT DOCUMENTS 674713  6/1952  United Kingdom ................ 123/270

*Primary Examiner*—Ronald B. Cox
*Attorney, Agent, or Firm*—Finnegan, Henderson, Farabow, Garrett and Dunner

[57] ABSTRACT

A structure for mounting a sub-combustion chamber in an internal combustion engine includes a ceramic sub-combustion chamber and a metal casing separated therefrom by an adiabatic air gap. The air gap is locate opposite to a portion of the external surface of the casing that is in contact with a cylinder head so that the negative effects of differences in the thermal characteristics of the sub-combustion chamber, the casing, and the cylinder head are eliminated.

8 Claims, 5 Drawing Figures

STRUCTURE FOR MOUNTING SUB-COMBUSTION CHAMBER IN AN INTERNAL COMBUSTION ENGINE

FIELD OF THE INVENTION

The present invention relates to a structure for mounting a sub-combustion chamber, and particularly relates to a sub-combustion chamber mounting structure for effectively cooling a sub-combustion chamber in a diesel engine.

BACKGROUND OF THE INVENTION

Recently, attempts have been made to make sub-combustion chambers in diesel engines of ceramic material A, as shown in FIGS. 1 and 2, to improve the thermal resistance as well as the thermal efficiency of the sub-combustion chambers. $Si_3N_4$ is a main component of a ceramic material that has been used and has substantially the same thermal conductivity as a metal cap for the chamber. Therefore, a method has been proposed in which a metal casing B is fitted onto an outer circumference of a ceramic body through an adiabatic air gap D to raise the combustion temperature by utilizing the thermal resistance of the ceramic material.

In FIG. 1, a metal casing B is shrunk-fit onto a ceramic body A, and in FIG. 2, a hollow ceramic body A is housed within a holding metal fitting B. In FIG. 2, the holding metal fitting B and the hollow body A are firmly sealed by a sealing material F and a metal fitting G.

In such arrangements, however, the temperature at a portion E of the metal casing in contact with the ceramic material rises so that the metal casing B loosens because it has a larger coefficient of thermal expansion than does the ceramic material. Accordingly, the portion E of the metal casing B at which the temperature becomes high is pressed into a cylinder head C so that superheating of the cylinder head occurs. This method, however, has another disadvantage in that a large temperature gradient occurs between the ceramic material and the metal portions. Also, the tightening force due to the pressure of the ceramic structure into the cylinder head when the former is mounted in the latter as well as the thermal deformation of the head during operation has serious negative effects on the ceramic structure A.

OBJECTS AND SUMMARY OF THE INVENTION

An object of the present invention is to provide an improved assembly for mounting a ceramic sub-combustion chamber in a cylinder block.

Another object of the present invention is to eliminate non-uniformity in thermal characteristics when a ceramic sub-combustion chamber is mounted in a cylinder block.

A further object of the present invention is to provide a ceramic sub-combustion chamber mounting assembly having improved reliability and a longer life.

Additional objects and advantages of othe invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purposes of the invention, as embodied and broadly described herein, a sub-combustion chamber assembly for use in a cylinder head is provided having an opening for receiving the assembly comprising a ceramic body including a central combustion chamber and an external surface, and a metal casing having an external surface and an internal surface surrounding a portion of the external surface of the ceramic body and being separated therefrom by an adiabatic gap, the adiabatic gap being located at a portion of the internal surface of the metal casing opposite a portion of the external surface of the casing adapted for contact with the cylinder head.

The accompanying drawings, which are incorporated in and constitute a part of this specification, illustrate several embodiments of the invention and together with the description, serve to explain the principles of the invention.

FIGS. 1 and 2 are cross sectional views of conventional assemblies for mounting a ceramic sub-combustion chamber in a cylinder head; and FIGS. 3 through 5 are cross sectional views of assemblies of various embodiments of the present invention for mounting a ceramic sub-combustion chamber in a cylinder head.

DETAILED DESCRIPTION

As described below, the temperature of a metal casing 2 rises according to the rising temperature of a ceramic sub-combustion chamber 1. A press-in portion of the metal casing 2 contacts a cylinder head 3 at a portion corresponding to an adiabatic air gap 9 between the ceramic sub-combustion chamber 1 and the metal casing 2 so that heat is discharged to the casing through the press-in portion to the cylinder head 3.

Figure 1:
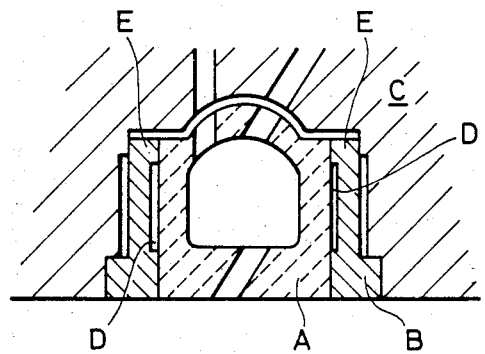
Figure 2:
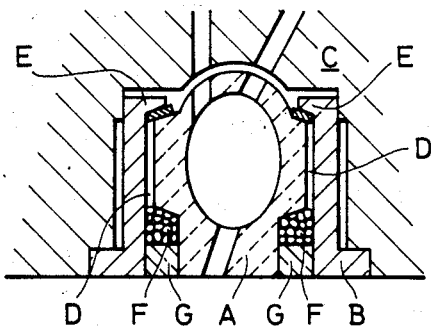
Figure 3:
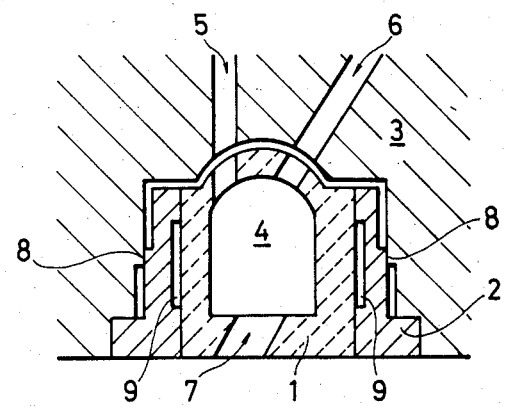
Figure 4:
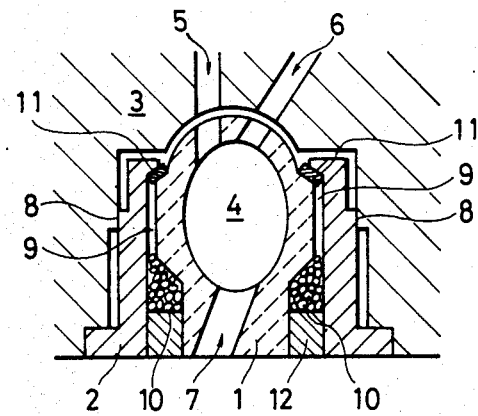
Figure 5:
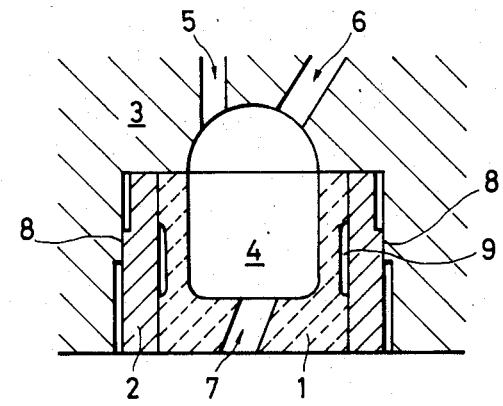

Referring to FIGS. 3–5, the metal casing 2 is shrunk-fit onto the periphery of the sub-combustion chamber 1 with an air layer or gap 9 therebetween, and the assembly is then press fitted into the cylinder head 3. A glow plug insertion hole 5, a fuel injection nozzle insertion hole 6, and a nozzle hole 7 communicate with a combustion chamber 4. A press-in contacting portion 8 is provided at a portion corresponding to at least a central portion of the adiabatic air gap 9.

As shown in FIG. 4, sealing agent 10, a packing 11, and a securing ring 12 are provided as illustrated. After sub-combustion chamber 1 is inserted into the metal casing 2 with the air gap 9 being formed therebetween, the sealing agent 10 is applied and the securing ring 12 is pushed into the metal casing 2 to tighten the metal casing 2 to the sub-combustion chamber 1.

With the above-mentioned structure, the fuel injected through the fuel injection nozzle 6 is lit in the chamber 4 and injected into a cylinder through the nozzle hole 7 to drive a piston. During this process, the heat generated at the chamber 4 of the sub-combustion chamber 1 is transmitted to the metal casing 2 through the contacting portion of the casing 2. Although the heat is prevented from being externally discharged by the adiabatic air gap 9, the generated heat is suitably discharged through the press-in contacting portion 8 between the metal casing 2 and the cylinder head 3 so as not to accumulate in the metal casing 2.

As described above, the structure for mounting the sub-combustion chamber in the internal combustion engine according to the present invention has superior effects in that the stress from the cylinder head is reduced, the temperature at the metal casing is unified, the temperature gradient in the ceramic sub-combustion chamber is lowered, and the metal casing is not pressed into the inner bottom portion of the cylinder head.

It will be apparent to those skilled in the art that various modifications and variations can be made to the present invention without departing from the scope or spirit of the invention.

What is claimed is:

1. A sub-combustion chamber assembly for inserting into a cylinder head comprising:
    a ceramic body including a central combustion chamber and an external surface;
    a metal casing surrounding said ceramic body having an external surface and an internal surface opposite the external surface of said ceramic body, a portion of said external surface of said metal casing contacting the cylinder head;
    an adiabatic air gap between said external surface of said ceramic body and said internal surface of said metal casing, said adiabatic air gap being located opposite said portion of said external surface of said metal casing contacting the cylinder head;
    further including sealing means for sealing said adiabatic gap and securing means for maintaining said sealing means in place and for securing said ceramic body to said metal casing.

2. A sub-combustion chamber assembly for inserting into a cylinder head comprising:
    a ceramic body including a central combustion chamber and an external surface;
    a metal casing surrounding the ceramic body having an internal surface adjacent to the external surface of the ceramic body, and an external surface adjacent to a surface of the cylinder head;
    contact surfaces for transmitting heat from the central combustion chamber through the ceramic body and the metal casing and to the cylinder head, said contact surfaces arranged at end portions of the adjacent surfaces of the metal fitting and the ceramic body and at a central portion of the adjacent surfaces of the metal casing and the cylinder head; and
    adiabatic gaps arranged between the adjacent surfaces of the ceramic body and the metal fitting at a central portion of the adjacent surfaces and between the adjacent surfaces of the metal fitting and the cylinder head at end portions of the adjacent surfaces.

3. A sub-combustion chamber according to claim 2, wherein the internal surface of the metal casing includes a cut-out portion for forming one of the adiabatic gaps.

4. A sub-combustion chamber according to claim 2, wherein the external surface of the ceramic body includes a cut-out portion for forming one of the adiabatic gaps.

5. A sub-combustion chamber according to claim 2, wherein the metal casing and ceramic body are press-fitted into the cylinder head.

6. A sub-combustion chamber according to claim 5, wherein the metal casing is shrink-fitted to the ceramic body.

7. A sub-combustion chamber according to claim 5, further comprising:
    packing means arranged between an end of the metal fitting and the ceramic body, said packing means defining one end of the adiabatic gap between the ceramic body and the metal casing;
    a sealing agent for defining another end of the adiabatic gap between the ceramic body and the metal casing; and
    a securing ring for pushing against the sealing agent to tighten the metal casing against the ceramic body.

8. A sub-combustion chamber according to claim 5, wherein a center point of the contact surface at a central portion of the adjacent surfaces of the metal casing and the cylinder head is directly across from a center point of the adiabatic gap arranged between the adjacent surfaces of the ceramic body and the metal casing.

* * * * *